(12) United States Patent
Kleinfeld et al.

(10) Patent No.: US 8,277,548 B2
(45) Date of Patent: Oct. 2, 2012

(54) COMBINED EXHAUST GAS AFTERTREATMENT/AIR CLEANER DUST AND EJECTOR UNIT

(75) Inventors: Chris Kleinfeld, Olivet, MI (US); Isidro Hernandez, Ypsilanti, MI (US); Shi Zheng, Ann Arbor, MI (US); Rick Veneziano, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 451 days.

(21) Appl. No.: 12/567,311

(22) Filed: Sep. 25, 2009

(65) Prior Publication Data

US 2011/0072807 A1 Mar. 31, 2011

(51) Int. Cl.
*B01D 39/00* (2006.01)
(52) U.S. Cl. ...... 96/380; 55/523; 55/385.3; 55/DIG. 10; 55/DIG. 30; 123/198 E; 60/311; 60/272; 60/295; 60/324; 60/689; 138/39; 138/44; 138/45; 239/398; 239/399; 180/68.3; 96/384; 96/388; 96/383; 96/386; 96/387
(58) Field of Classification Search ............ 55/523, 55/385.3, DIG. 10, DIG. 30; 60/311, 272, 60/295, 324, 689, 694; 138/39, 44, 45; 123/198 E; 180/68.3; 239/398, 399
See application file for complete search history.

(56) References Cited

U.S. PATENT DOCUMENTS

| 3,137,563 | A | 6/1964 | Newcomer et at |
| 3,419,892 | A | 12/1968 | Wagner et al. |
| 2006/0123771 | A1 | 6/2006 | Cheng |
| 2008/0141662 | A1 | 6/2008 | Schuster et al. |

OTHER PUBLICATIONS

International Search Report and Written Opinion dated Nov. 15, 2011.

*Primary Examiner* — Jason M Greene
*Assistant Examiner* — Dung H Bui
(74) *Attorney, Agent, or Firm* — Wood, Phillips, Katz, Clark & Mortimer

(57) ABSTRACT

A combined exhaust gas aftertreatment/dust ejector unit (10) is provided for use with a combustion process (14) and an air cleaner (16) of the combustion process (14). The unit (10) includes an elongate housing (30) containing an exhaust gas aftertreatment device (40) and having a radial exhaust gas outlet (34) to direct an exhaust gas flow (12) radially from the housing (30), and a dust ejector (60) including an ejector outlet (62) positioned in the exhaust gas outlet (34). The exhaust gas outlet (34) and the ejector outlet (62) have elliptical shaped cross sections (68,70), with the ejector outlet cross section (70) spaced inwardly from the exhaust gas outlet (34) to define a reduced flow area (72) for the exhaust gas flow (12) to accelerate the exhaust gas flow (12) past the ejector outlet (62).

20 Claims, 5 Drawing Sheets

COMBINED EXHAUST GAS AFTERTREATMENT/AIR CLEANER DUST AND EJECTOR UNIT

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

Exhaust gas aftertreatment systems and air cleaner systems for use with combustion processes, and in more particular applications, exhaust gas aftertreatment systems and air cleaner systems for use with combustion engines, such as diesel combustion engines.

BACKGROUND OF THE INVENTION

It is known to utilize a dust ejector with the inlet air cleaner of a combustion engine and it is also known to utilize the exhaust gas flow through the exhaust system of the combustion engine to draw air through the dust ejector. One example can be seen in U.S. Pat. No. 4,178,760 which shows a dust ejector having a first inlet connected to the exhaust system of an internal combustion engine and a second inlet connected to the air intake filter of the internal combustion engine.

SUMMARY OF THE INVENTION

In accordance with one feature of the invention, a combined exhaust gas aftertreatment/dust ejector unit is provided for use with a combustion process and an air cleaner of the combustion process. The unit includes an elongate housing containing an exhaust gas aftertreatment device and having an exhaust gas inlet to receive an exhaust gas flow from the combustion process and a radial exhaust gas outlet to direct the exhaust gas flow radially from the housing, the exhaust gas outlet having a cross section defined by two opposed long sides and two opposed short sides connecting the long sides, and a dust ejector including an ejector outlet positioned in the exhaust gas outlet, and an ejector conduit extending from the ejector outlet to an exterior of the housing for connection with the air cleaner. The ejector outlet has a cross section defined by two opposed long sides spaced inwardly from the two long sides of the exhaust gas outlet and two opposed short sides connecting the long sides of the ejector outlet and spaced inwardly from the short sides of the exhaust gas outlet.

According to one feature, the aftertreatment device is a muffler.

In one feature, the short sides of the outlet cross sections are curved sides.

As one feature, the long sides of the exhaust gas outlet cross section are straight sides.

According to one feature, the long sides of the ejector outlet cross section are curved sides.

In one feature, the cross sections are centered on a common axis.

As one feature, the ejector outlet flares outwardly from ejector conduit in a direction parallel to the long sides of the outlet cross sections.

According to one feature, the unit further includes an exhaust gas outlet conduit extending axially from the exhaust gas outlet.

As one feature, the housing is a cylindrical housing, and the ejector conduit is a cylindrical conduit.

According to one feature, the housing includes an outlet plenum downstream from the aftertreatment device to collect the exhaust gas flow therefrom, and the exhaust gas outlet is located in a radial wall of the plenum. In a further feature, the ejector conduit extends through the plenum.

In accordance with one feature of the invention, a combined exhaust gas aftertreatment/dust ejection unit is provided for use with a combustion process and an air cleaner of the combustion process. The unit includes an elongate housing containing an exhaust gas aftertreatment device and having an exhaust gas inlet to receive an exhaust gas flow from the combustion process and a radial exhaust gas outlet to direct the exhaust gas flow radially from the housing; and a dust ejector including an ejector outlet positioned in the exhaust gas outlet, and an ejector conduit extending from the ejector outlet to an exterior of the housing for connection with the air cleaner. The exhaust gas outlet and the ejector outlet have elliptical shaped cross sections with the ejector outlet cross section spaced inwardly from the exhaust gas outlet to define a reduced flow area for the exhaust gas flow to accelerate the exhaust gas flow past the ejector outlet.

As one feature, the aftertreatment device is a muffler.

According to one feature, the housing is a cylindrical housing.

In one feature, the ejector conduit is a cylindrical conduit.

As one feature, the ejector outlet flares outwardly from the ejector conduit along a major axis defined by the elliptical shaped cross section of the ejector outlet.

According to one feature, the cross sections are centered on a common axis.

In one feature, the unit further includes an exhaust gas outlet conduit extending axially from the exhaust gas outlet.

As one feature, the housing includes an outlet plenum downstream from the aftertreatment device to collect the exhaust gas flow therefrom, and the exhaust gas outlet is located in a radial wall of the plenum. In a further feature, the ejector conduit extends through the plenum.

Other objects, features, and advantages of the invention will become apparent from a review of the entire specification, including the appended claims and drawings.

DETAILED DESCRIPTION OF THE PREFERRED EMBODIMENT

Figure 1:
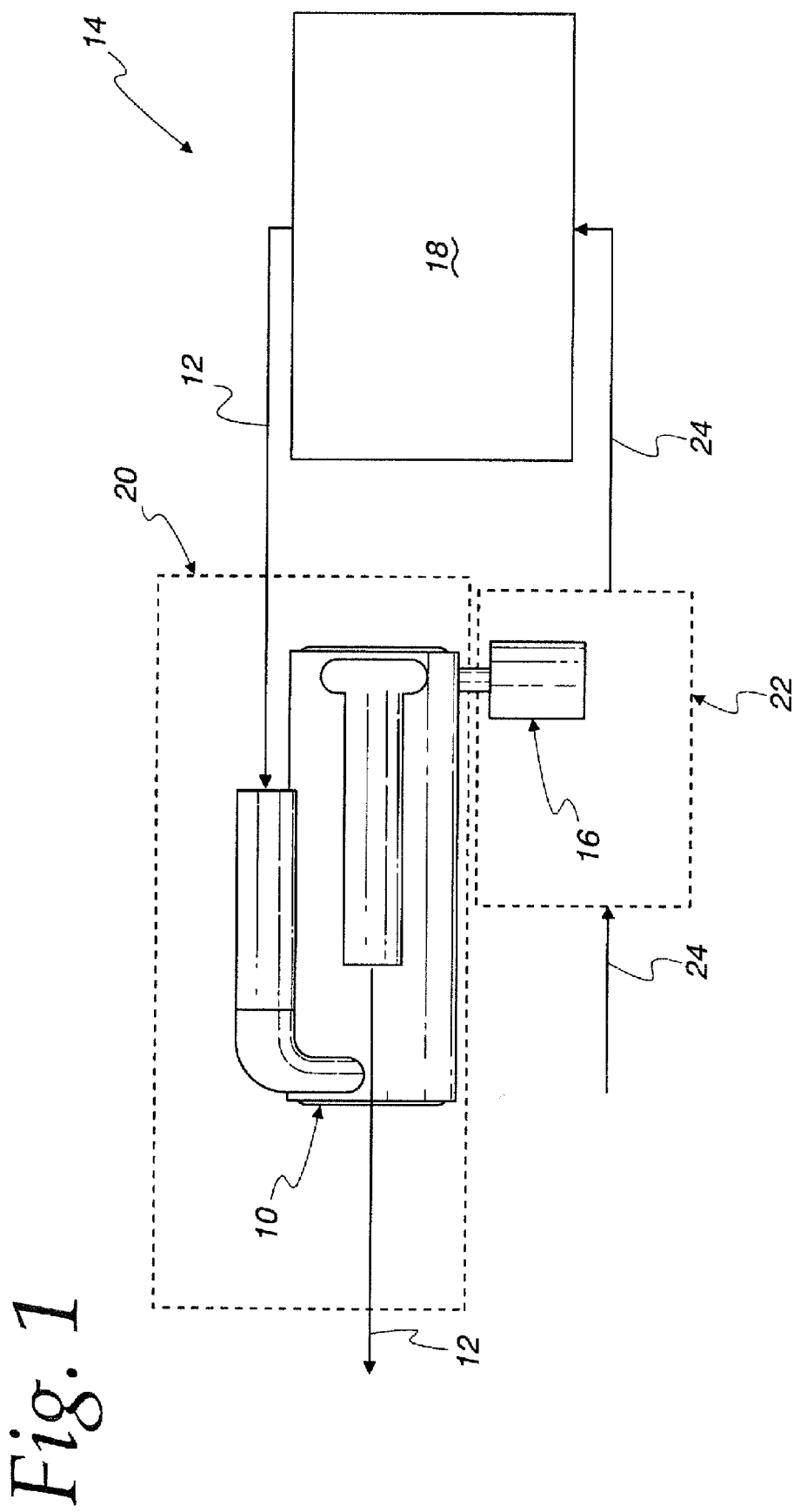
FIG. 1 is a diagrammatic representation showing a combustion process incorporating a combined exhaust gas aftertreatment/dust ejector unit embodying the present invention.

A combined exhaust gas aftertreatment/dust ejection unit 10 is provided for use with an exhaust gas flow 12 of a combustion process 14 and an air cleaner 16 of the combustion process 14. In the illustrated embodiment, the combustion process 14 includes a diesel combustion engine 18, an aftertreatment system 20 for treating the exhaust gas flow 12 from the engine 18, and an inlet air system 22 for treating the inlet air flow 24 to the engine 18.

The exhaust gas aftertreatment system 20 can include a number of aftertreatment components, including a muffler, a diesel particulate filter (DPF), and/or a $NO_x$ reducing device, such as a selective catalytic reduction catalyst (SCR) or a lean $NO_x$ trap and a burner that selectively supplies the exhaust at an elevated temperature to the rest of the system 20. Similarly, the inlet air system 22 can include a number of inlet air treatment components, such as for example, an air filter, a preheater, a supercharger, or a turbocharger.

Figure 2:
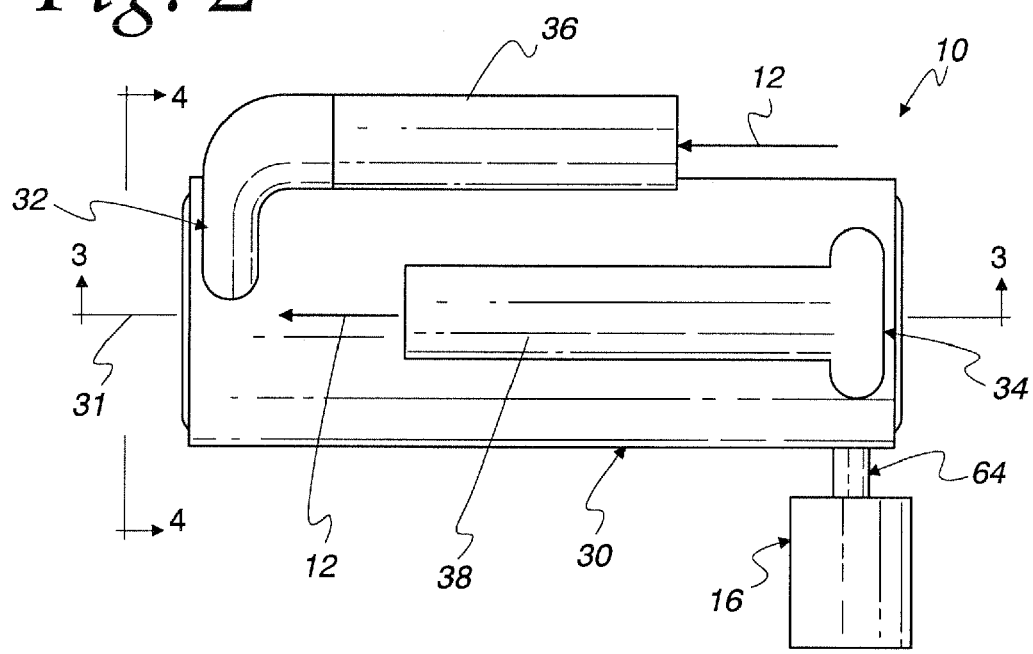
FIG. 2 is an elevation view of the combined exhaust gas aftertreatment/dust ejector unit of FIG. 1.

With reference to FIG. 2, the combined exhaust gas aftertreatment/dust ejector unit 10 includes an elongate housing 30 extending along a longitudinal axis 31 and having a radial exhaust gas inlet 32 to direct the exhaust gas flow 12 from the combustion engine 18 radially into the unit 30, and a radial exhaust gas outlet 34 to direct the exhaust gas flow 12 radially from the housing 30. In one preferred form, which is illustrated, the housing 30 is cylindrical, with a cylindrical inlet conduit 36 extending axially from the inlet 32 and a cylindrical outlet conduit 38 extending axially from the outlet 34.

Figure 3:
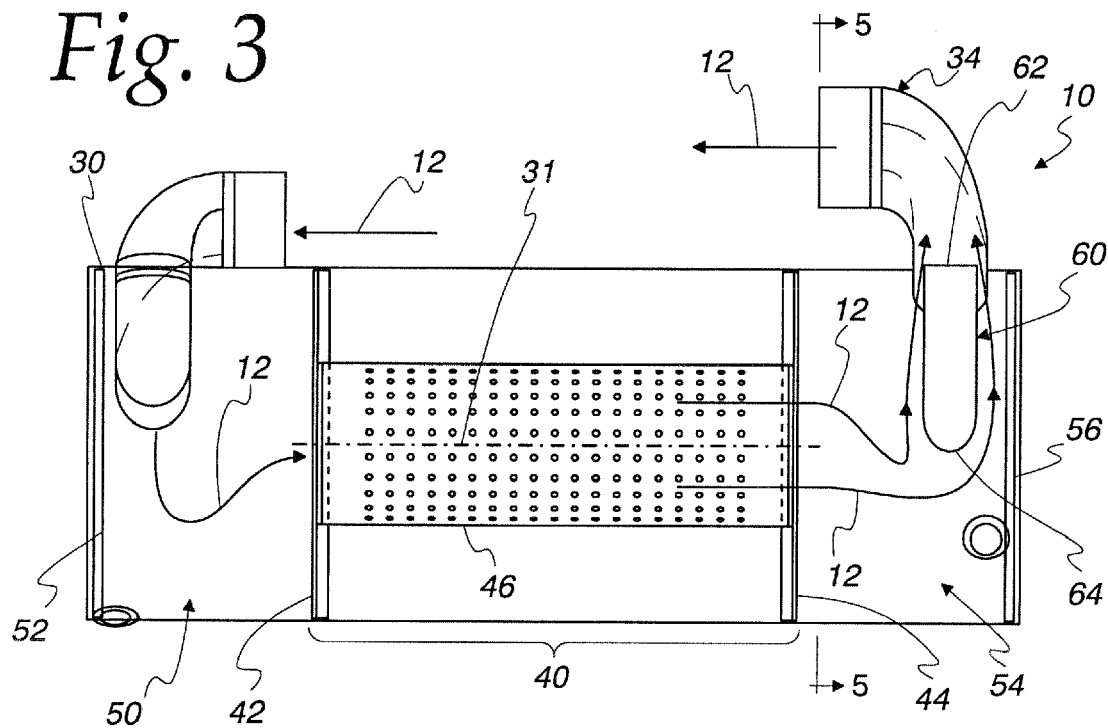
FIG. 3 is a section view taken along line 3-3 in FIG. 2.
Figure 4:
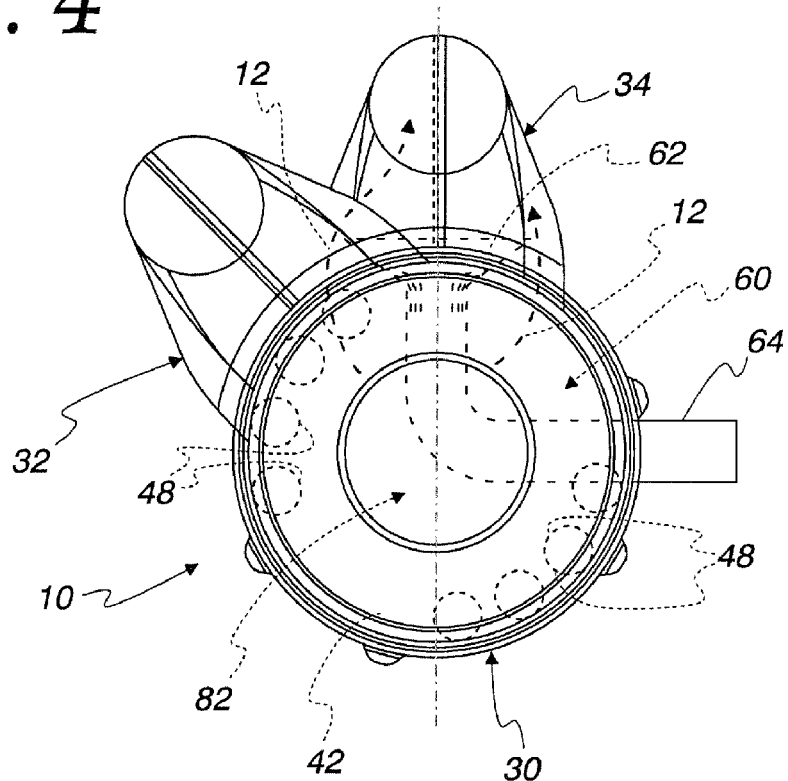
FIG. 4 is a left-hand view taken from line 4-4 in FIG. 2.

As best seen in FIG. 3, the housing 30 contains an exhaust gas aftertreatment device in the form of a muffler 40 including a pair of disc-shaped baffle plates 42 and 44 spaced by a cylindrical, perforated baffle tube 46. As best seen in FIG. 4, the baffle plate 42 includes a series of circumferentially spaced circular openings 48 to allow a portion of the exhaust gas flow 12 to surround the baffle tube 46. As best seen in FIG. 3, an inlet plenum 50 is defined between the baffle plate 42 and a disc-shaped end cap 52 of the housing 30, and an outlet plenum 54 is defined between the baffle plate 44 and a disc-shaped end cap 56 of the housing 30. The inlet plenum 50 services to distribute the exhaust gas flow 12 to the muffler 40 and the outlet plenum 50 serves to collect the exhaust gas flow 12 from the muffler 40.

Figure 5:
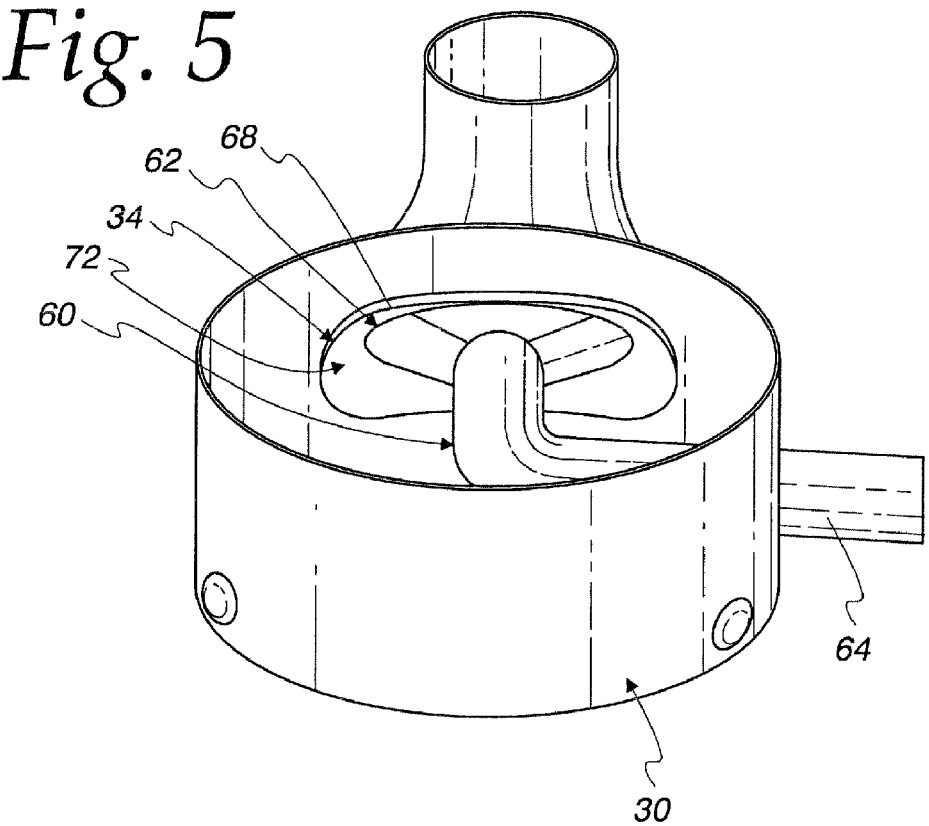
FIG. 5 is an enlarged perspective view from below of selected components of the combined exhaust gas aftertreatment/dust ejector unit taken generally from line 5-5 in FIG. 3.
Figure 6:
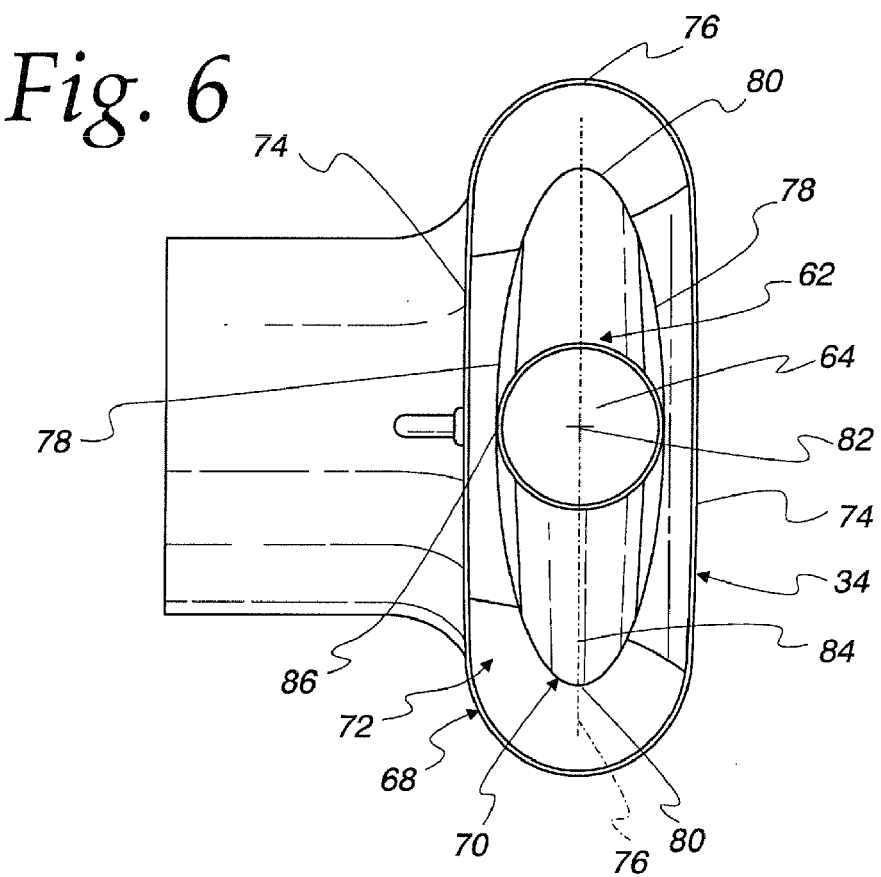
FIG. 6 is an enlarged view of selected components of the combined exhaust gas aftertreatment/dust ejector unit taken from line 6-6 in FIG. 5.
Figure 7:
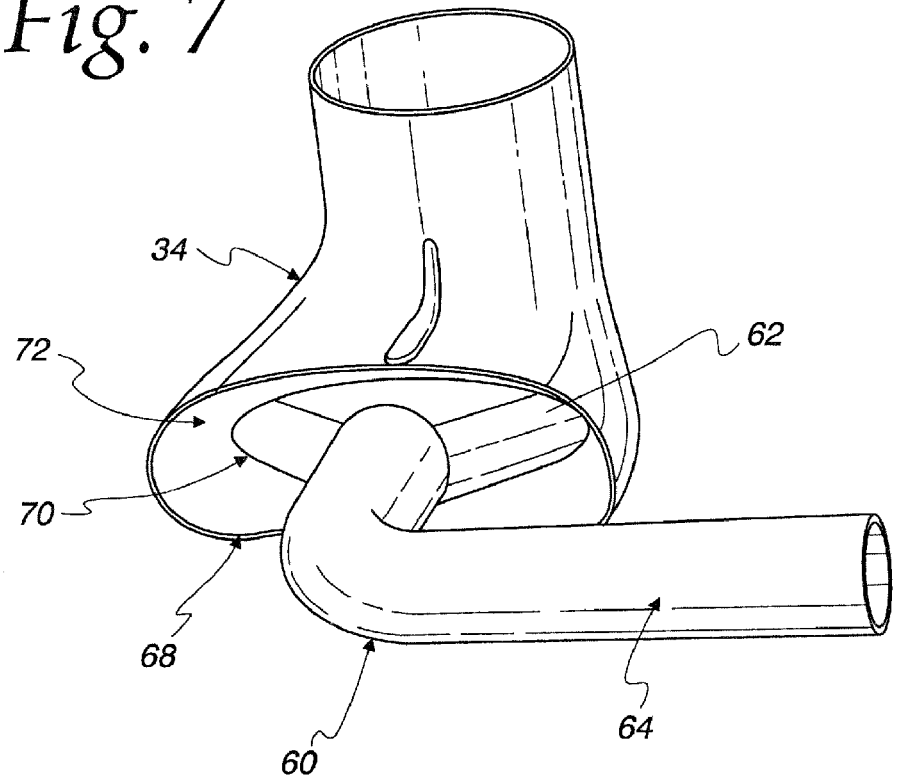
FIG. 7 is an enlarged perspective view of selected components from FIG. 5.
Figure 8:
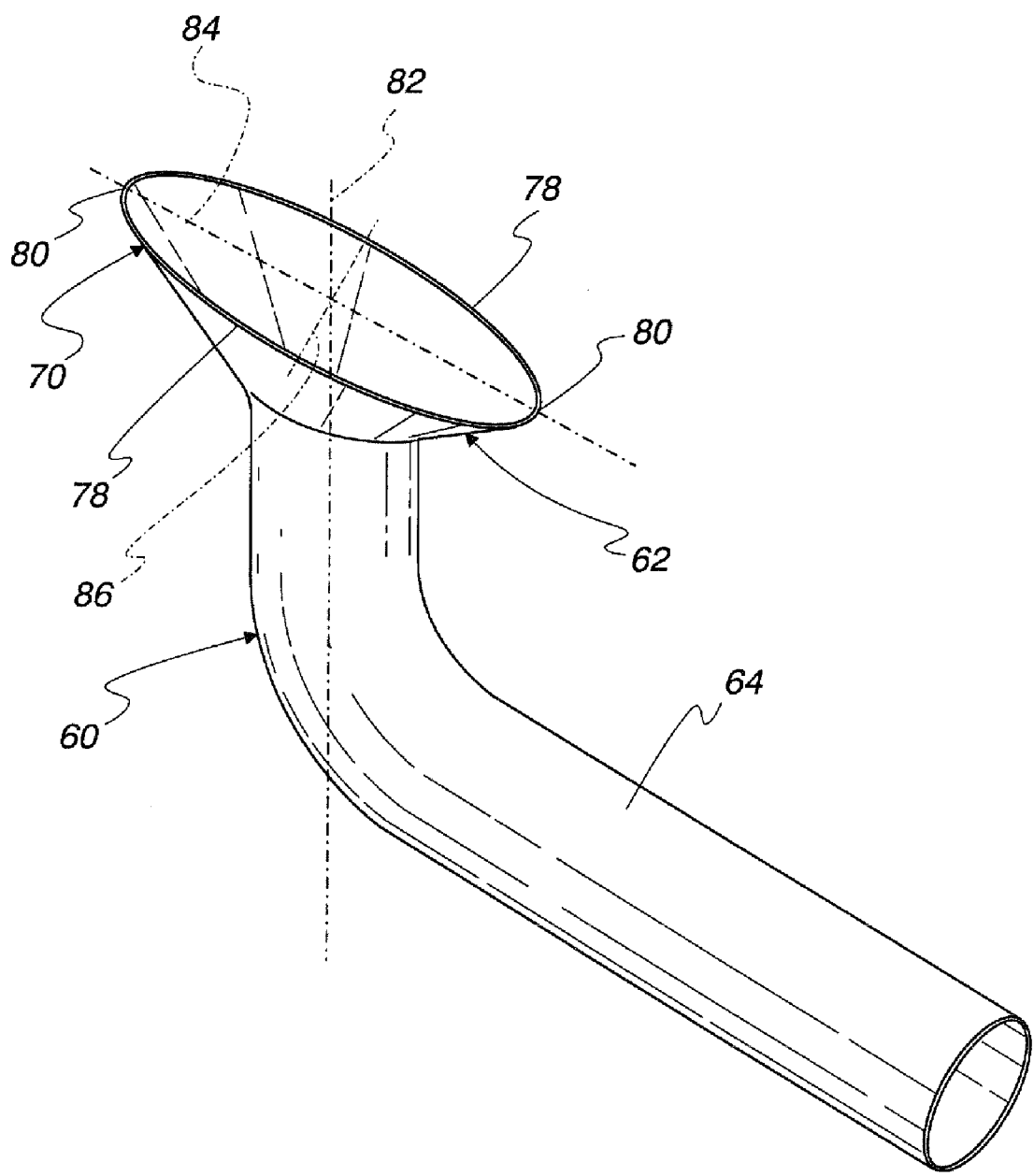
FIG. 8 is a perspective view from above of an ejector component of FIGS. 2-7.

As best seen in FIGS. 3 and 5, the unit 10 further includes a dust ejector 60 having an ejector outlet 62 positioned in the exhaust gas outlet 34 and an ejector conduit 64 extending from the ejector outlet 62 through the plenum 54 to an exterior of the housing 30 for connection with the air cleaner 16 (best seen in FIG. 2). As best seen in FIG. 6, the exhaust gas outlet 34 and the ejector outlet 62 have elliptical-shaped cross sections 68 and 70, with the ejector outlet cross section 70 spaced inwardly from the exhaust gas outlet cross section 68 to define a reduced flow area 72 between the cross sections 68 and 70 to accelerate the exhaust gas flow 12 past the ejector outlet 62. The cross section 68 of the exhaust gas outlet 34 is defined by two opposed long sides 74 and two opposed short sides 76 connecting the long sides 74. Similarly, as best seen in FIGS. 6-8, the ejector outlet cross section 70 is defined by two opposed long sides 78 spaced inwardly from the two long sides 74 of the exhaust gas outlet 34, and two opposed short sides 80 connecting the long sides 78 and spaced inwardly from the short sides 76 of the exhaust gas outlet 34. In a preferred embodiment, which is illustrated, the short sides 74 and 76 are curved, the long sides 74 are straight, and the long sides 78 are curved. Preferably, the cross sections are both centered on a common axis 82 and define a major axis 84 and a minor axis 86 transverse to the axis 82 and passing through the axis 82.

Preferably, as best seen in FIGS. 4-8, the ejector outlet 62 flares outwardly from the ejector conduit 64 along the major axis 84. It is believed this flaring helps to reduce the pressure drop across the dust ejector outlet 62.

In operation, the exhaust gas flow 12 passes through the muffler 40 to be collected in the plenum 54 and directed through the outlet 34 while accelerating through the reduced flow area 72 between the elliptical shaped cross sections 68 and 70 of the outlets 34 and 62, which creates a Venturi effect around the ejector outlet 62 that draws air and dust from the air cleaner 16 via the conduit 64. The ejected air and dust travel with the exhaust gas flow 12 through the remainder of the aftertreatment system 20.

It should be appreciated that while the preferred embodiment illustrated herein is shown in connection with a muffler 40, the combined unit 10 could utilize other aftertreatment devices, including any of the specific examples previously mentioned. It should also be appreciated that while the housing 30 has been shown as cylindrical, other shapes are possible for the housing 30, as are other constructions. Further, it should be appreciated that while one construction has been shown for the muffler 40, others are possible and may be desirable depending upon the particular requirements of each application.

The invention claimed is:

1. A combined exhaust gas aftertreatment/dust ejector unit for use with an exhaust gas flow of a combustion process and an air cleaner of the combustion process, the unit comprising:
an elongate housing containing an exhaust gas aftertreatment device and having an exhaust gas inlet to receive the exhaust gas flow from the combustion process and a radial exhaust gas outlet to direct the exhaust gas flow radially from the housing, the exhaust gas outlet having a cross section defined by two opposed long sides and two opposed short sides connecting the long sides; and
a dust ejector comprising an ejector outlet positioned in the exhaust gas outlet, and an ejector conduit extending from the ejector outlet to an exterior of the housing for connection with the air cleaner, the ejector outlet having a cross section defined by two opposed long sides spaced inwardly from the two long sides of the exhaust gas outlet and two opposed short sides connecting the long sides of the ejector outlet and spaced inwardly from the short sides of the exhaust gas outlet.

2. The unit of claim 1 wherein the aftertreatment device is a muffler.

3. The unit of claim 1 wherein the short sides of the outlet cross sections are curved sides.

4. The unit of claim 1 wherein the long sides of the exhaust gas outlet cross section are straight sides.

5. The unit of claim 1 wherein the long sides of the ejector outlet cross section are curved sides.

6. The unit of claim 1 wherein the cross sections are centered on a common axis.

7. The unit of claim 1 wherein the ejector outlet flares outwardly from ejector conduit in a direction parallel to the long sides of the outlet cross sections.

8. The unit of claim 1 further comprising an exhaust gas outlet conduit extending axially from the exhaust gas outlet.

9. The unit of claim 1 wherein said housing is a cylindrical housing, and said ejector conduit is a cylindrical conduit.

10. The unit of claim 1 wherein said housing comprises an outlet plenum downstream from the aftertreatment device to collect the exhaust gas flow therefrom, and the exhaust gas outlet is located in a radial wall of the plenum.

11. The unit of claim 10 wherein said ejector conduit extends through the plenum.

12. A combined exhaust gas aftertreatment/dust ejection unit for use with an exhaust gas flow of a combustion process and an air cleaner of the combustion process, the unit comprising:

an elongate housing containing an exhaust gas aftertreatment device and having an exhaust gas inlet to receive the exhaust gas flow from the combustion process and a radial exhaust gas outlet to direct the exhaust gas flow radially from the housing; and a dust ejector comprising an ejector outlet positioned in the exhaust gas outlet, and an ejector conduit extending from the ejector outlet to an exterior of the housing for connection with the air cleaner; wherein the exhaust gas outlet and the ejector outlet have elliptical shaped cross sections with the ejector outlet cross section spaced inwardly from the exhaust gas outlet to define a reduced flow area for the exhaust gas flow to accelerate the exhaust gas flow past the ejector outlet.

13. The unit of claim 12 wherein the aftertreatment device is a muffler.

14. The unit of claim 12 wherein the housing is a cylindrical housing.

15. The unit of claim 12 wherein the ejector conduit is a cylindrical conduit.

16. The unit of claim 12 wherein the ejector outlet flares outwardly from the ejector conduit along a major axis defined by the elliptical shaped cross section of the ejector outlet.

17. The unit of claim 12 wherein the cross sections are centered on a common axis.

18. The unit of claim 12 further comprising an exhaust gas outlet conduit extending axially from the exhaust gas outlet.

19. The unit of claim 12 wherein said housing comprises an outlet plenum downstream from the aftertreatment device to collect the exhaust gas flow therefrom, and the exhaust gas outlet is located in a radial wall of the plenum.

20. The unit of claim 19 wherein said ejector conduit extends through the plenum.

* * * * *